United States Patent [19]

Harada et al.

[11] Patent Number: 4,605,701

[45] Date of Patent: Aug. 12, 1986

[54] SMALL-GLOBULAR CROSSLINKED MONOALLYLAMINE POLYMER AND PROCESS FOR PRODUCING THE SAME

[75] Inventors: Susumu Harada, Koriyama; Sakuro Hasegawa, Fujisawa; Koichi Sato, Fukushima, all of Japan

[73] Assignee: Nitto Boseki Co., Ltd., Fukushima, Japan

[21] Appl. No.: 662,726

[22] Filed: Oct. 19, 1984

[30] Foreign Application Priority Data

Oct. 25, 1983 [JP] Japan ................................. 58-198399

[51] Int. Cl.[4] .................... C08F 126/02; C08F 271/00
[52] U.S. Cl. ................................. 525/107; 525/113; 525/115; 525/123; 525/154; 525/291; 525/293; 525/328.2; 525/353; 525/359.2; 525/359.4; 525/359.5; 525/359.6; 525/374; 525/386
[58] Field of Search ............... 526/310; 525/328.2, 525/107, 113, 115, 123, 154, 291, 293, 353, 359.2, 359.4, 359.5, 359.6, 374, 386

[56] References Cited

U.S. PATENT DOCUMENTS

| | | | |
|---|---|---|---|
| 2,456,428 | 12/1948 | Parker | 525/328.2 |
| 3,104,205 | 9/1963 | Hainer | 525/328.2 |
| 4,504,640 | 3/1985 | Harada | 526/310 |
| 4,559,391 | 12/1985 | Ueda | 525/328.2 |

FOREIGN PATENT DOCUMENTS 513995 5/1976 U.S.S.R. ........................ 525/328.2

*Primary Examiner*—C. Warren Ivy
*Attorney, Agent, or Firm*—Bert J. Lewen; Henry Sternberg

[57] ABSTRACT

A small-globular crosslinked polymer of monoallylamine swellable but insoluble in water can be obtained by crosslinking a part of the amino groups of a monoallylamine polymer with formaldehyde or a compound having, in its molecule, at least two functional groups reactive with primary amino group.

8 Claims, No Drawings

SMALL-GLOBULAR CROSSLINKED MONOALLYLAMINE POLYMER AND PROCESS FOR PRODUCING THE SAME

The present invention relates to a small-globular crosslinked monoallylamine polymer and a process for producing said polymer.

Functionalized polymers prepared by introducing various reactive groups into insoluble polymers are watched with interest today. These resins are practically important because of their nonpolluting and recyclable nature.

Among such functionalized resins, ion exchange resin and chelating resin have been used since many years ago. In the recent years, fixation of physiologically active molecules, such as pharmaceutical molecule, enzyme molecule and the like, on a polymeric support is extensively tried. Further, support for organic syntheses, polymeric catalyst, polyelectrolyte complex, permeable membrane, adsorbing resin and the like are also utilized extensively.

The polymer to be used as a base for the production of such functionalized resins should have many functional groups capable or reacting with as many kinds as possible of compounds, in its molecule. In this sense, the typical polymer having electrophilic functional groups is chloromethylated polystyrene. On the other hand, typical polymers having nucleophilic functional groups include polyacrylic acid (functional group: —COOH), polyvinyl alcohol (—OH), polyethyleneimine (—NH—,

and —NH$_2$), polyvinylamine (—NH$_2$) and the like. Among the nucleophilic functional groups, primary amino group (—NH$_2$) is most preferable from the viewpoint of reactivity (easiness and variety of reaction) and stability of linkage formed after reaction. Polyvinylamine, the typical polymer having primary amino group, cannot be synthesized by a direct process, because its monomer cannot exist stably. For this reason, there have been proposed since many years ago a number of attempts to synthesize polyvinylamine by indirect processes. However, no inexpensive industrial production process thereof has been established yet.

Although polyethyleneimine has been industrially manufactured from many years ago, the major part of its amino groups is occupied by secondary or tertiary amino groups, and primary amino group is found only at the molecular ends. Further, its secondary amino group has only a low reactivity due to steric hindrance, because it constitutes a unit of main chain.

The polyallylamine used in the present invention is of course a polymer having primary amino group only, and its amino group is not directly linked to the main chain but it is separated from the main chain through intermediation of a methylene group. Accordingly, its reactivity is considered higher than that of the amino group of polyvinylamine, and in this sense polyallylamine is an ideal base polymer for the production of functionalized resins. Monoallylamine used as the starting compound of polyallylamine is a quite stable compound easy to produce, unlike vinylamine. However, its polymerization has hitherto been regarded as quite difficult to practise, and no industrial process for producing polyallylamine has ever been known.

Recently, the present inventors have discovered that an inorganic acid salt of polyallylamine can be produced quite easily if an inorganic acid salt of monoallylamine is polymerized in an aqueous medium in the presence of a specified azo type initiator. Based on this discovery, the inventors have established an industrial production process of polyallylamine, i.e. a polyamine polymer containing only primary amino group as its functional groups, and have applied for a patent regarding this process (Japanese Patent Application No. 54,933/83).

Thus, it is the object of the present invention to provide a small-globular crosslinked polymer of monoallylamine which is satisfactorily usable in the production of ion exchange resin or chelating resin or for the fixation of physiologically active molecules such as enzyme molecule and is further usable as an intermediate for the production of various functional resins, as well as to provide a process for producing said polymer.

For achieving the above-mentioned object, the present inventors have conducted elaborated studies and found that a small-globular crosslinked polymer of monoallylamine can be obtained by dispersing a solution of monoallylamine polymer in an aqueous solvent into a liquid medium immiscible with said aqueous solvent, and subjecting a part of the amino groups of said polymer to a cross-linking reaction by the use of formaldehyde or a compound having two or more functional groups reactive with primary amino group in its molecule, while maintaining the system in the state of a dispersion. Based on this finding, the present invention has been accomplished.

Thus, the present invention provides a small-globular crosslinked polymer of monoallylamine swellable but insoluble in water wherein a part of the amino groups of a monoallylamine polymer is crosslinked with formaldehyde or a compound having, in its molecule, at least two functional groups reactive with primary amino group, as well as a process for producing said small-globular cross-linked polymer of monoallylamine which comprises dispersing a solution of a monoallylamine polymer in an aqueous solvent into a liquid medium immiscible with said aqueous solvent, followed by subjecting a part of the amino groups present in said polymer to a crosslinking reaction with formaldehyde or a compound having, in its molecule, at least two functional groups reactive with primary amino group.

The solution of polyallylamine in an aqueous solvent used in the invention is prepared by dissolving a polyallylamine obtained by the process mentioned in, for example, the above-mentioned Japanese Patent Application No. 54,988/83 into water or a water-methanol mixture, or by neutralizing an aqueous solution of inorganic acid salt of polyallylamine with an alkali such as sodium hydroxide. In the latter case, a complete neutralization of the inorganic acid is not always necessary, but a partial neutralization is also allowable. The salt of the inorganic acid (for example, sodium chloride) formed by the neutralization may be present in the aqueous solution. The concentration of polyallylamine in this solution is 10% to 80% by weight, and preferably 30% to 60% by weight. Although an aqueous solution is used usually, a solution in a water-methanol mixture may be more preferable when the crosslinking agent (mentioned later) is entirely insoluble in water.

As the liquid medium immiscible with the polyallylamine solution, any medium may be used so long as it is inert to the crosslinking agent. Preferably, however, the medium has a boiling point of 60° C. or above under ordinary pressure. Usually, aliphatic or aromatic halogenated hydrocarbon or aliphatic or aromatic hydrocarbon, such as carbon tetrachloride, trichlorethylene, dichloromethane, tetrachlorethylene, chlorobenzene, dichlorobenzene, benzene, toluene, xylene and the like, is used for this purpose either in the state of single substance or in the state of a mixture.

Preferably, specific gravity of said liquid medium should be close to the specific gravity of the polyallylamine solution under the conditions of the cross-linking reaction. For this reason, it is usual in many cases that a halogenated hydrocarbon having a high specific gravity and hydrocarbon having a low specific gravity are mixed together at an appropriate ratio and the resulting mixture is put to use.

The crosslinking agent used in the invention is formaldehyde or a compound having at least two functional groups of at least one kind selected from halogen group, aldehyde group, epoxy group, carboxyl group, acid anhydride group, acid halide group, N-chloroformyl group, chloroformate group, imido-ether group, amidinyl group, isocyanate group, vinyl group and the like. Typical example of said compound include the followings:

Br—(CH$_2$)$_{n1}$—Br [n$_1$ = an integer of 2 to 10]

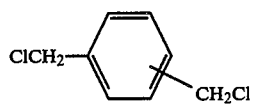

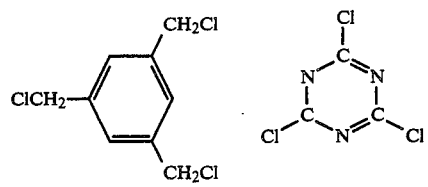

X—CH$_2$—CH—CH$_2$—X [X = Cl or Br]
    |
    OH

OHC—(CH$_2$)$_{n2}$—CHO [n$_2$ = an integer of 0 to 10]   HCHO

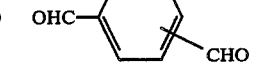

CH$_2$——CH—CH$_2$X [X = Cl or Br]
  \  /
   O

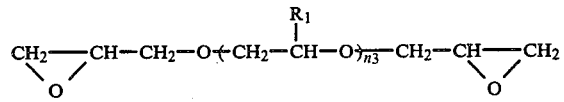

[R$_1$ = H or CH$_3$; n$_3$ = an integer of 0 to 10]

Glycerin-di or -tri-glycidyl ether, 1,1,1-Trimethylolpropane-di- or -tri-glycidyl ether, Pentaerythritorl-di-, -tri- or -tetra-glycidyl ether, Sorbitol-di-, -tri- or -tetra-glycidyl ether,

R$_2$—N—(CH$_2$—CH——CH$_2$)$_2$
              \  /
               O

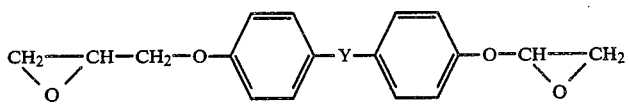

[R$_2$ = alkyl, alkenyl, aryl or aralkyl group]

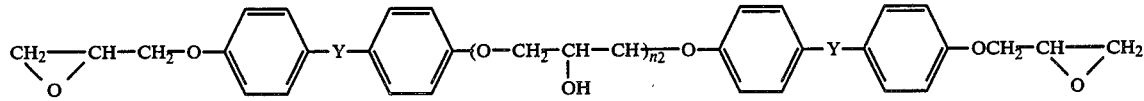

[Y = —CH$_2$—, —SO$_2$—, —C(CH$_3$)$_2$— or —O—; n$_4$ = 1-5]   HOOC—(CH$_2$)$_{n5}$—COOH [n$_5$ = 2-10]

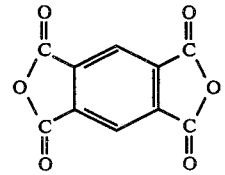

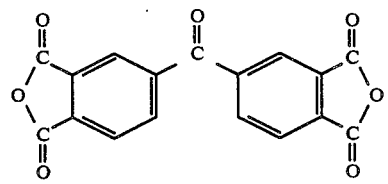

ClC—(CH$_2$)$_{n6}$—CCl [n$_6$ = 2-10]   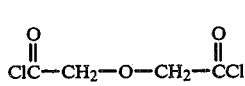 ClC—CH$_2$—O—CH$_2$—CCl

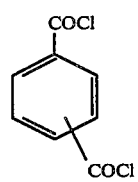

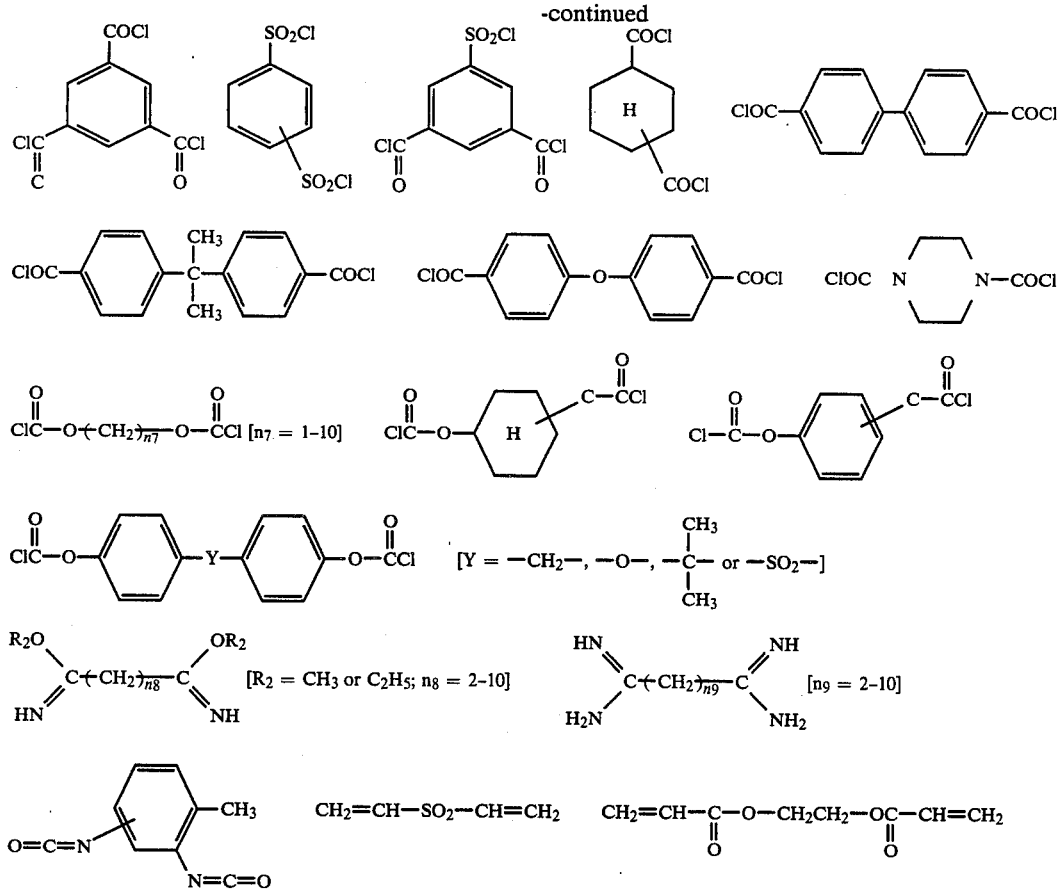
-continued

All these compounds may be used either in the state of single substance or in combination of two or more members.

Since these crosslinking agents are different from one another in the solubility in water, the reactivity with water, the reactivity with primary amino group, the length of molecule and the flexibility of molecular chain, a suitable crosslinking agent should be selected for the particle diameter, the swelling property in water, the form-stability, the toughness and the porosity of the intended small-globular crosslinked monoallylamine polymer.

Although the amount of the crosslinking agent to be used in the invention varies depending on the above-mentioned conditions, it should be an amount giving a ratio (functional group in crosslinking agent)/(amino group in polyallylamine) of 1/100 to 40/100 and preferably 5/100 to 20/100, as expressed in terms of "molar ratio". The crosslinking agent used in the reaction do not completely react with polyallylamine to form cross-linkage, but the percentage of crosslinking agent consumed by the reaction is usually 50 to 95%. As a general tendency, the percentage of reacted crosslinking agent is lower in a crosslinking agent less soluble in water. Accordingly, a crosslinking agent not readily soluble in water is recommendably once dissolved into methanol and the methanolic solution is mixed with aqueous solution of polyallylamine and then dispersed into liquid medium. If the aqueous solution of polyallylamine is firstly dispersed into liquid medium and thereafter the crosslinking agent is added to the dispersion, the effective percentage of reacted crosslinking agent is usually low. Therefore, the aqueous solution of polyallylamine and the crosslinking agent are mixed together and partially reacted and thereafter the reacted mixture is dispersed into the liquid medium. Although the temperature and duration of the reaction are dependent on the kind of crosslinking agent, the reaction temperature is usually 100° C. or lower and the reaction time is usually 5 hours or shorter.

In order to disperse and suspend the aqueous solution of polyallylamine in the liquid medium, a non-ionic or cationic surfactant or alkyl ether of cellulose is usually used in the invention. A mechanical stirring or an ultrasonic dispersion may also be employed in addition to or in stead of the use of these dispersants.

The small-globular polyallylamine of the invention obtained by the above-mentioned crosslinking reaction has a particle diameter varying depending upon the method of dispersion employed at the time of crosslinking reaction, the presence or absence of dispersion stabilizer and the kind of dispersion stabilizer used. The particle diameter can be widely varied in the range from 10 microns to 2 mm, as measured in dryness.

All the functional groups present in the small-globular polyallylamine of the invention are primary amino groups, except for the amino groups which have been Participated in the crosslinking reaction. Since they are not directly linked to the main chain, the functional groups have a high mobility and a high reactivity. Up to today, there has never been disclosed such a small-globular resin which has only primary amino group as its functional groups.

The small-globular crosslinked polyallylamine polymer of the invention is usable as it is as a weakly basic ion exchange resin, a chelating resin, and the like. Further, owing to the high reactivity of its primary amino groups, it is utilizable for the production of various functionalized resins.

The production process of the polyallylamine used in the invention has been mentioned in detail in the above-mentioned Japanese Patent Application No. 54,988/83. The following referential example illustrates one embodiment of the production process.

REFERENTIAL EXAMPLE

With stirring, 570 g (10 moles) of monoallylamine ($CH_2=CH-CH_2NH_2$) is dropwise added to 1.1 kg of concentrated hydrochloric acid (35% by weight) at an ice-cooled temperature of 5° to 10° C. After adding it, the water and the excessive hydrogen chloride are distilled off at 60° C. under a reduced pressure of 20 mmHg by means of a rotary evaporator to obtain a white-colored crystalline product. The latter is dried on a drying silica gel under a reduced pressure of 5 mmHg at 80° C. to obtain 980 g of monoallylamine hydrochloride (MAA-HCl) having a water content of about 5%.

Then, 590 g (6 moles) of the MAA-HCl and 210 g of distilled water are placed in a 2 liter round bottom flask equipped with a stirrer, a thermometer, a reflux condenser and a nitrogen gas inlet tube and dissolved with stirring to prepare a 70% aqueous solution of MAA-HCl. While passing nitrogen gas, the solution is heated to 50° C.

Then, a solution of 7 g of 2,2′-diamidinyl-2,2′-azopropane dihydrochloride (radical initiator) in 20 ml of distilled water is added. A generation of heat becomes detectable in about one hour, after which the mixture is cooled with stirring to maintain a liquid temperature of 48° to 52° C. When 30 hours has passed, the same quantity as above of the initiator is again added, and the polymerization reaction is continued for an additional 30 hours at a temperature of 50°±1° C. As the result, a colorless, transparent, viscous solution is obtained. The solution is poured into a large quantity of methanol, and there is obtained a precipitate of a white-colored polymer. The precipitate is collected by filtration, washed with methanol and dried at 50° C. under reduced pressure to obtain 540 g of polyallylamine hydrochloride (PAA-HCl) having a number average molecular weight ($\overline{M}_n$) of 7,500.

Next, the process for producing the small-globular crosslinked polymer of monoallylamine of the invention will be illustrated in detail with reference to the following examples.

EXAMPLE 1

An aqueous solution of polyallylamine (containing sodium chloride) was prepared by dissolving 19.6 g (0.2 mole) of the polyallylamine hydrochloride (PAA-HCl) prepared according to the procedure of Referential Example into 20 g of 40% aqueous solution of sodium hydroxide. Then, 2.5 g of 1,6-dibromohexane was added to the resulting solution and preliminarily reacted at room temperature for 20 minutes with stirring.

Then, 200 ml of chlorobenzene and 100 ml of o-dichlorobenzene were placed in a 500 ml round bottom flask equipped with a stirrer, a reflux condenser and a thermometer, to which was added 2 g of sorbitan sesquioleate (non-ionic surfactant) (Silban S-83, manufactured by Matsumoto Yushi Seiyaku K.K.) as a dispersion stabilizer. Into this mixed liquid medium, the above-mentioned aqueous solution of polyallylamine preliminarily reacted with 1,6-dibromohexane was added and dispersed by stirring the mixture at a speed of about 600 r.p.m. While stirring it, the temperature was elevated to 60° C., and it was reacted at 60°±2° C. for 3 hours to form crosslinkage. After the reaction, the mixture was cooled to room temperature, and the resulting small-globular polyallylamine was collected by filtration with a glass filter, washed successively with methanol, water and 1N sodium hydroxide solution, thoroughly washed with deionized water and dried at 50° C. under reduced pressure. Thus, about 12 g of a crosslinked monoallylamine polymer having a particle diameter of 20 to 500µ was obtained. The degree of swelling* of this polymer in water, 1/10 N hydrochloric acid and 1/10 N sodium hydroxide solution was 6.8 (times), 6.2 and 4.2, respectively.

*Volume of resin after immersion in liquid for 24 hours/volume of resin in dryness.

EXAMPLE 2

An aqueous solution of polyallylamine (Solution A) was prepared by dissolving 196 g (2 moles) of PAA-HCl prepared according to the procedure of Referential Example into 160 g of 25% aqueous solution of sodium hydroxide. In Solution A, about 50% of the hydrogen chloride in the PAA-HCl had been neutralized to form sodium chloride.

Then, 200 ml of chlorobenzene, 100 ml of o-dichlorobenzene and 2 g of Silvan S-83 were placed in the same 500 ml round bottom flask as used in Example 1.

On the other hand, 1.58 g of epichlorohydrin was added to 50 g of Solution A and stirred and homogenized for about 2 minutes. The resulting mixture was added into the above-mentioned round bottom flask and dispersed with stirring at a stirring speed of about 600 r.p.m. After subjecting the resulting dispersion to a crosslinking reaction at room temperature (25° C.) for 30 minutes with stirring, its temperature was elevated to 50° C. and crosslinking reaction was carried out at this temperature for 2 hours. After the reaction, the mixture was cooled to room temperature, and the resulting small-globular polyallylamine was collected by filtration by means of a glass filter, washed successively with methanol, water and 1N sodium hydroxide solution, thoroughly washed with deionized water, and dried at 50° C. under reduced pressure. Thus, about 16 g of a crosslinked monoallylamine polymer having a particle diameter of 20 to 500µ was obtained.

Next, another crosslinked monoallylamine polymer was prepared by repeating the above-mentioned procedure, except that the epichlorohydrin (crosslinking agent) was used in an amount of 2.11 g or 2.64 g. From the small globules of polymer thus obtained, the fraction having a particle diameter of 300µ or smaller, occupying about 95% of the whole, was collected by means of a sieve, and its degree of swelling in water, 1/10N hydrochloric acid and 1/10N sodium hydroxide solution was measured. Further, the performances of this small-globular polymer as an anion exchange resin were also investigated. The results are summarized in Table 1.

TABLE 1

| No. | Amount of polyallylamine aq. grams (mole) | Amount of epichlorohydrin grams (mole) | Degree of swelling (times) in Water | 1/10 N HCl | 1/10 N NaOH | Anion-exchange capacity meq/g-Dry | meq/g-Wet |
| --- | --- | --- | --- | --- | --- | --- | --- |
| 1 | 50 (2/7) | 1.58 (12/700) | 6.9 | 5.0 | 3.6 | 12.8 | 1.3 |
| 2 | 50 (2/7) | 2.11 (16/700) | 6.5 | 4.0 | 3.4 | 11.9 | 1.4 |
| 3 | 50 (2/7) | 2.64 (20/700) | 4.0 | 3.5 | 3.3 | 11.2 | 1.6 |

The small-globular polymer obtained under the conditions of Run No. 3 of Table 1 was fractionated by means of a sieve, and the fraction having a particle diameter of 300μ or smaller was examined for the metal-adsorbing ability as a chelating resin, by the following procedure.

Ion-exchange capacities were all measured by batch process. Cu(NO$_3$)$_2$, CoCl$_2$ and MnSO$_4$ were separately dissolved in 50 ml of Clark-Lubs buffer solution to prepare 0.01 M/liter metallic salt solutions. Then, 0.25 g of the resin was added to each of the metallic salt solutions and reacted at 30° C. for 24 hours with intermittent stirring, after which the resin was filtered off. Ten milliliters of each filtrate was teken out and its residual ion content was measured by the chelate titration method. The results were as shown in Table 2.

TABLE

| pH | Amount of adsorbed ion (meq/g-Dry) | | |
| --- | --- | --- | --- |
|  | $Cu^{2+}$ | $Co^{2+}$ | $Mn^{2+}$ |
| 2 | 2.03 | 0.90 | 0.83 |
| 4 | 2.45 | 0.89 | 2.24 |
| 6 | 2.39 | 1.71 | 3.06 |
| 8 | Not measured | 0.49 | 3.44 |

EXAMPLE 3

The procedure of Example 2 was repeated, except that the epichlorohydrin used as a crosslinking agent was replaced with 3.8 g of polyethylene glycol diglycidyl ether (Epolite 400E, manufactured by Kyoeisha Yushi Kagaku K.K.) represented by the following formula:

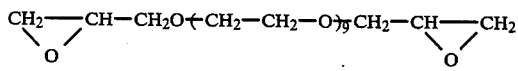

Thus, about 17 g of a crosslinked monoallylamine polymer having a particle diameter of 20 to 500μ was obtained. Its degree of swelling in water, 1/10N hydrochloric acid and 1/10N sodium hydroxide solution was 8.0 (times), 8.8 and 7.6, respectively.

EXAMPLE 4

The epichlorohydrin used in Example 2 as a crosslinking agent was replaced with 3.0 g of 28% aqueous solution of formaldehyde. After mixing the aqueous solution of formaldehyde with Solution A, the mixture was immediately dispersed into a dispersion medium, and thereafter a crosslinking reaction was carried out just in the same manner as in Example 2. Thus, about 16 g of a crosslinked monoallylamine polymer having a particle diameter of 20 to 500μ was obtained. Its degree of swelling in water, 1/10N hydrochloric acid and 1/10N sodium hydroxide solution was 4.5, 5.2 and 3.8, respectively.

EXAMPLE 5

The epichlorohydrin used in Example 2 as a crosslinking agent was replaced with 2.3 g of benzenetetracarboxylic acid dianhydride. After dissolving the latter into 10 ml of methanol, the resulting solution was mixed with Solution A, and the mixture was immediately dispersed into a dispersion medium. Thereafter, a cross-linking reaction was carried out just in the same manner as in Example 2. Thus, about 16 g of a crosslinked monoallylamine polymer having a particle diameter of 20 to 500μ was obtained. Its degree of swelling in water, 1/10N hydrochloric acid and 1/10N sodium hydroxide solution was 5.4, 6.4 and 5.8, respectively.

EXAMPLE 6

The epichlorohydrin used in Example 2 as a crosslinking agent was replaced with 5.8 g of terephthalic acid dichloride. After dispersing Solution A into a dispersion medium, the terephthalic acid dichloride was added to the dispersion and a crosslinking reaction was carried out at 25° C. for one hour with stirring, after which the treatment of Example 2 was repeated. Thus, a crosslinked monoallylamine polymer having a particle diameter of 20 to 500μ was obtained. Its degree of swelling in water, 1/10N hydrochloric acid and 1/10N sodium hydroxide solution was 4.3, 5.2 and 4.3, respectively.

EXAMPLE 7

The epichlorohydrin used in Example 2 as a crosslinking agent was replaced with 3 g of N,N'-dichloroformylpiperazine. After mixing the latter with Solution A, the mixture was immediately dispersed into a dispersion medium, and then a crosslinking reaction was carried out just in the same manner as in Example 2. Thus, about 16 g of a crosslinked monoallylamine polymer having a particle diameter of 20 to 500μ was obtained. Its degree of swelling in water, 1/10N hydrochloric acid and 1/10N sodium hydroxide solution was 11.0, 11.2 and 10.0, respectively.

EXAMPLE 8

Into 39.6 g of an aqueous solution of polyallylamine prepared by the same procedure as in Example 1 was mixed 2.2 g of tetramethylenebis-amidine dihydrochloride represented by the following formula:

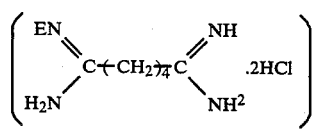

Then, the resulting mixture was immediately dispersed into a dispersion medium in the same manner as in Example 1, and a crosslinking reaction was carried out at 25° to 30° C. for one hour with stirring. After the reaction, the resulting small-globular polymer was treated in the same manner as in Example 1 to obtain about 12 g of a cross-linked monoallylamine polymer having a particle diameter of 10 to 400μ. Its degree of swelling in water, 1/10N hydrochloric acid and 1/10N sodium hydroxide solution was 9.8, 10.2 and 9.6, respectively.

EXAMPLE 9

Into 39.6 g of an aqueous solution of polyallylamine prepared by the same procedure as in Example 1 was mixed 2.4 g of divinylsulfone ($CH_2$=CH—$SO_2$—CH=$CH_2$). The resulting mixture was immediately dispersed into a mixed liquid medium in the same manner as in Example 1, and a crosslinking reaction was carried out at 25° to 30° C. for one hour with stirring. After the reaction, the resulting small-globular polymer was treated in the same manner as in Example 1 to obtain about 13 g of a crosslinked monoallylamine polymer having a particle diameter of 10 to 400μ. Its degree of swelling in water, 1/10N hydrochloric acid and 1/10N sodium hydroxide solution was 8.4, 9.8 and 8.8, respectively.

What is claimed is:

1. A crosslinked homopolymer of monoallylamine having appendent primary amino groups and a particle size, when dry, of not more than 2 mm, said polymer being swellable but insoluble in water, wherein at least a part of the primary amine group of an uncrosslinked monoallylamine polymer is crosslinked with formaldehyde or a compound having at least two functional groups reactive with said primary amine groups, said crosslinked homopolymer being prepared by crosslinking the polymeric material while in the form of a dispersion in an immiscible liquid.

2. The homopolymer of claim 1 wherein the functional groups are at least one of the groups selected from halogen, aldehyde, epoxy, carboxyl, carboxylic acid anhydride, carboxylic acid halide, sulfonyl halide, N-chloroformyl, chloroformate, imido-ether, amidinyl, isocyanate and vinyl.

3. The homopolymer of claim 1 wherein crosslinking is performed while an aqueous solution of the monoallylamine polymer is dispersed in a liquid medium immiscible with the aqueous solution and the molar ratio of the functional groups in the crosslinking agent to the amino groups in the monoallylamine polymer is from 1:100 to 40:100 and the percentage of crosslinking agent consumed is from 50 to 95%.

4. A process for producing a crosslinked homopolymer of monoallylamine which comprises dispersing an aqueous solution of a monoallylamine polymer in a liquid medium immiscible with said aqueous solvent and crosslinking at least a part of the amino groups of said polymer with formaldehyde or a compound having at least two functional groups reactive with said amino groups, said crosslinking taking place while the aqueous solution is maintained in said dispersed state.

5. The process of claim 4 wherein said functional groups are at least one of the groups consisting of halogen, aldehyde, epoxy, carboxyl, carboxylic acid anhydride, carboxylic acid halide, sulfonyl halide, N-chloroformyl, chloroformate, imido-ether, amidinyl, isocyanate and vinyl.

6. The process of claim 4 wherein the aqueous solvent is a water solution of sodium hydroxide and the liquid medium is a halogenated hydrocarbon having a boiling point of at least 60° C. under atmospheric pressure.

7. The process of claim 4 wherein the molar ratio of the functional groups in said crosslinking agent to the amino groups in said polyallylamine is from 1:100 to 40:100 and the percentage reaction of said crosslinking agent is from 50 to 95%.

8. The process of claim 4 wherein the polyallylamine is dispersed during said crosslinking reaction so as to form particles having a diameter, when dry, of less than 2 mm.

* * * * *